US007063858B2

(12) United States Patent
Saniez et al.

(10) Patent No.: US 7,063,858 B2
(45) Date of Patent: Jun. 20, 2006

(54) SWEET WITH A ROUGH TEXTURE INTENDED FOR THE TREATMENT OF HALITOSIS

(75) Inventors: Marie-Hèlène Saniez, Saint-Andre lez Lille (FR); Guillaume Ribadeau-Dumas, Verlinghem (FR); Céline Taillez, Thumeries (FR)

(73) Assignee: Roquette Freres, Lestrem (FR)

( * ) Notice: Subject to any disclaimer, the term of this patent is extended or adjusted under 35 U.S.C. 154(b) by 106 days.

(21) Appl. No.: 10/044,527

(22) Filed: Jan. 11, 2002

(65) Prior Publication Data
US 2002/0132000 A1 Sep. 19, 2002

(30) Foreign Application Priority Data
Jan. 12, 2001 (FR) .................................. 01 00437

(51) Int. Cl.
*A61K 9/20* (2006.01)
*A61K 47/26* (2006.01)
*A61K 47/40* (2006.01)
*A23G 3/00* (2006.01)

(52) U.S. Cl. ................ 424/440; 426/523; 426/660; 426/103

(58) Field of Classification Search ................ 426/523, 426/660, 103; 424/400, 440, 465
See application file for complete search history.

(56) References Cited

U.S. PATENT DOCUMENTS

| 4,263,328 | A |   | 4/1981  | Parada et al. |
| 4,692,339 | A |   | 9/1987  | Stetson et al. |
| 4,804,548 | A | * | 2/1989  | Sharma et al. |
| 5,436,329 | A |   | 7/1995  | Caboche |
| 5,462,760 | A | * | 10/1995 | Serpelloni et al. .......... 426/572 |
| 5,470,591 | A |   | 11/1995 | Ribadeau-Dumas et al. |
| 5,493,014 | A |   | 2/1996  | Caboche |
| 5,580,601 | A | * | 12/1996 | Ribadeau-Dumas et al. ..... 426/660 |
| 5,620,871 | A |   | 4/1997  | Caboche |
| 5,637,344 | A |   | 6/1997  | Carpenter et al. |
| 6,030,605 | A |   | 2/2000  | D'Ameila et al. |
| 6,083,527 | A |   | 7/2000  | Thistle |
| 6,572,886 | B1| * | 6/2003  | Ribadeau-Dumas et al. ..... 424/464 |

FOREIGN PATENT DOCUMENTS

| EP | 0 481 940   | 4/1992 |
| WO | WO 91 07100 | 5/1991 |

OTHER PUBLICATIONS

Derwent abstract XP-002178376 of CN 1 114 862 A.
Patent abstract of JP 07 309 734 A.
Anonymous: "Candy stays dandy", Food Review, vol. 27, N° 10, 2000, p. 23 XP 001028679 *p. 23*.
Derwent abstract of DE2426916.

* cited by examiner

*Primary Examiner*—Edward J. Webman
(74) *Attorney, Agent, or Firm*—Young & Thompson

(57) ABSTRACT

The invention relates to a sweet of boiled sugar type exhibiting a rough texture intended for the treatment of halitosis as well as process for making the same and a method for treating halitosis using the same.

11 Claims, No Drawings

SWEET WITH A ROUGH TEXTURE INTENDED FOR THE TREATMENT OF HALITOSIS

TECHNICAL FIELD OF THE INVENTION

A subject-matter of the invention is a sweet of "boiled sugar" type with a rough texture which can be used for treating problems of halitosis by reducing the lingual bacterial load.

BACKGROUND OF THE ART

The expression "boiled sugar" denotes, in the field of confectionery, hard sweets which are well known to the consumer and which exhibit a brittle consistency and a glassy appearance.

Bad breath, also known as halitosis, generally arises in the buccal cavity. Hydrogen sulphide and methyl mercaptan are the main malodorous components which are formed from bacterial decomposition of protein substrates comprising thiol groups and disulphides, which are primary derivatives of the cellular components in the saliva. The content of volatile sulphur compounds in the breath is particularly high in the case of an inflammatory condition or after long periods of reduction in salivary flow during sleep and after buccal cleaning processes have ceased. This content of volatile sulphur compounds in the breath can be significantly reduced in the majority of cases by means of careful brushing of the buccal cavity, including the dorsal-posterior surface of the tongue, or by rinsing with a mouthwash comprising zinc salts. The tongue is very often the cause of halitosis. This is because it comprises numerous villi which retain the bacteria responsible for bad breath and form a lingual deposit.

Mouthwashes are not always effective as they do not make it possible to reach the whole of the bacterial layer at the surface of the tongue and are sometimes astringent for the buccal cavity.

The most effective treatment consists in cleaning the tongue using a tongue scraper and in using a buccal solution. The tongue scraper makes it possible to remove the lingual deposit and thus to reduce by half the bad smell given off. The major disadvantage of this nevertheless very effective treatment is the great inconvenience caused by the use of this type of device. Provision has also been made to clean the tongue using a toothbrush but this technique is itself also very inconvenient and somewhat painful.

At the same time, confectionery based on polyols intended for buccal hygiene is known, such as that disclosed in U.S. Pat. No. 6,083,527, the anti-halitosis effect of which is based on the increase in the pH of the saliva due to the presence of calcium hydroxide.

DESCRIPTION OF THE INVENTION

In order to avoid the inconveniences of scraping the tongue and with the aim of inhibiting the growth of, indeed even of removing, the microorganisms involved in halitosis, the Applicant has developed a novel "boiled sugar" sweet with a rough texture which scrapes the tongue without injuring it so as to strip off the bacterial film responsible for halitosis.

The expression "boiled sugar" denotes, in the field of confectionery, hard, glassy and brittle sweets well known to the consumer. The "boiled sugar" sweets in accordance with the invention have the distinguishing feature of exhibiting a rough texture, that is to say more exactly a granular texture, throughout the body of the sweet.

A subject-matter of the invention is thus a sweet of cooked sugar type, characterized in that it exhibits a rough texture intended for the treatment of halitosis.

Another subject-matter of the invention is a process for the preparation of a novel sweet of boiled sugar type exhibiting the said rough texture.

To achieve such a texture, unusual in confectionery of this type, the Applicant has found, after lengthy research, that it is appropriate to add, to the massecuite of boiled sugar, a specific ingredient corresponding to the following two criteria:
  a melting point of greater than 110° C.
  a mean particle size of greater than or equal to 200 microns and preferably of greater than or equal to 400 microns.

The sweet in accordance with the invention is thus characterized in that it comprises a crystalline ingredient capable of conferring on it a rough texture intended for the treatment of halitosis.

Crystalline ingredient capable of conferring on the cooked sugar a rough texture intended for the treatment of halitosis is therefore intended to mean any powdered saccharide, which may or may not be hydrogenated, corresponding to these criteria.

Use may thus be made, without this list being exhaustive, of mannitol, maltitol, erythritol, isomalt, anhydrous lactitol, sucrose, anhydrous dextrose, lactose, anhydrous trehalose, mannose, galactose, xylose or cyclodextrins.

Crystalline ingredient capable of conferring on the boiled sugar a rough texture intended for the treatment of halitosis is also understood to mean any organic acid or organic acid salt corresponding to the two criteria of melting point and of particle size set out above.

To prepare sweets in accordance with the present invention, use is made of a process, characterized in that it comprises the following stages:
  cooking a carbohydrate or a mixture of carbohydrates at atmospheric pressure at a temperature sufficient to allow vitrification of the massecuite when it is cooled;
  addition to the massecuite of a crystalline ingredient capable of conferring on the sweet a rough texture intended for the treatment of halitosis.

As regards the stage of cooking at atmospheric pressure, this can optionally be followed by application of a vacuum.

The carbohydrate or the mixture of carbohydrates which can be used in the process according to the invention can be chosen from any carbohydrate known to a person skilled in the art which is suitable for the preparation of good-quality boiled sugars.

This carbohydrate or this mixture of carbohydrates will advantageously be chosen from a large number of possibilities, such as in particular sucrose-glucose syrup mixtures, sucrose-glucose syrup and water mixtures, maltitol syrups, sorbitol syrups, hydrogenated glucose syrups, mannitol or isomalt and hydrogenated glucose syrups, mannitol or isomalt and maltitol syrups, syrups of maltitol as a mixture with mannitol and water, isomalt and water mixtures, isomalt, polydextrose and water mixtures, or hydrogenated or non-hydrogenated dextrins.

The carbohydrate or the mixtures of carbohydrates can in particular comprise oligosaccharides or polysaccharides, dextrins or polyglucoses, such as polydextroses, for example those disclosed in Patent Application EP 561 090, of which the Applicant is proprietor. The boiled sugars will thus advantageously be less calorific. These carbohydrates can naturally be combined with one another.

The carbohydrate or mixture of carbohydrates which can be used according to the process in accordance with the invention can also be hydrogenated. It will then be chosen in particular from the hydrogenated syrups disclosed in Patent Applications EP 0 561 089, EP 0 561 088 and EP 0 611 527, of which the Applicant is proprietor. Isomalt, pure or as a mixture, can be added thereto.

According to an alternative form of the process according to the invention, the mixture of carbohydrates is a maltitol syrup, sold by the Applicant under the name Lycasin® HBC, or an isomalt syrup.

According to a preferred alternative form of the process in accordance with the invention, the ingredient capable of conferring a rough texture on the boiled sugar is incorporated in the cooked sugar massecuite at a content of approximately 20% by dry weight.

According to another preferred alternative form of the process in accordance with the invention, the said ingredient is a crystalline polyol.

The boiled sugar sweet according to the present invention thus exhibits the twofold advantage of contributing to the treatment of halitosis and of not being cariogenic.

A better understanding of the invention will result from the following examples, which are meant to be illustrative and not limiting.

EXAMPLE 1

Boiled sugars were prepared according to the following recipe:

| INGREDIENT | BOILED SUGARS A | BOILED SUGARS B | Composition on a dry basis (%) A | B |
|---|---|---|---|---|
| Lycasin ® HBC | 842.4 g | 842.7 g | 79.6 | |
| Mannitol 400 DC | 153.7 g | 0 | 19.9 | |
| Maltitol powder | 0 | 153.7 g | | 19.9 |
| Aspartame | 2.7 g | 2.7 g | 0.3 | |
| Menthol | 1.2 g | 1.2 g | 0.2 | |

The mannitol 400 DC is a mannitol powder with a mean particle size of approximately 400 microns.

The maltitol powder has a particle size of between 400 and 800 microns.

The Lycasin® HBC is cooked at 135° C.

The mixture of mannitol 400 DC or of maltitol, of aspartame and of menthol is subsequently added.

The mixture is tempered and shaped.

The sweets obtained have a rough appearance and scrape the surface of the tongue without injuring it throughout their time in the mouth.

EXAMPLE 2

One hour after the end of the meal, an impression of the dorsum of the tongue is taken in order to evaluate the bacteria present at the surface. Immediately afterwards, a sweet according to the invention was consumed like a normal boiled sugar, that is to say virtually until it had completely melted away, and then a second impression of the dorsum of the tongue was taken.

The medium for incubating the impressions is composed of brain heart infusion.

The media are incubated under anaerobiosis conditions at 37° C. for 2 days.

| | Number of colonies per cm$^2$ after the meal | Number of colonies per cm$^2$ after ingestion of the sweet |
|---|---|---|
| TEST 1 | 41 | 9 |
| TEST 2 | 65 | 22 |

These results clearly demonstrate the effect of reducing the bacterial population at the surface of the tongue and thus the treatment of halitosis after consumption of a sweet according to the invention.

The invention claimed is:

1. A sweet of boiled sugar exhibiting a rough texture intended for the treatment of halitosis, comprising a crystalline ingredient conferring on it said rough texture, wherein said crystalline ingredient exhibits a particle size of greater than 200 microns and a melting point of greater than 110° C., and wherein said crystalline ingredient is selected from the group consisting of mannitol, maltitol, erythritol, isomalt, anhydrous lactitol, sucrose, lactose, mannose, galactose, xylose and cyclodextrins.

2. The sweet according to claim 1, wherein said crystaline ingredient exhibits a particle size of greater than 400 microns.

3. A method for the treatment of halitosis using a sweet according to claim 1.

4. A process for the preparation of a sweet of boiled sugar according to claim 1, comprising the following stages:
   cooking a carbohydrate or a mixture of carbohydrates at atmospheric pressure at a temperature sufficient to allow vitrification of the massecuite when it is cooled;
   addition to the massecuite of a crystalline ingredient capable of conferring on the sweet a rough texture intended for the treatment of halitosis, at a temperature below that of the melting point of the crystalline ingredient.

5. The process according to claim 4, wherein the carbohydrate in the mixture of carbohydrates is selected from the group consisting of sucrose and glucose syrup mixtures, sucrose, glucose syrup and water mixtures, maltitol syrups, sorbitol syrups, hydrogenated glucose syrups, mannitol or isomalt and hydrogenated glucose syrups, mannitol or isomalt and maltitol syrups, isomalt and water, isomalt, polydextrose and water, and hydrogenated or nonhydrogenated dextrins.

6. The process according to claim 4, wherein the carbohydrate or the mixture of carbohydrates comprises a maltitol or isomalt syrup.

7. The process according to claim 4, wherein the crystalline ingredient capable of conferring a rough texture on the sweet has a mean particle size of greater than 400 microns.

8. The process according to claim 4, wherein said ingredient is a crystalline polyol.

9. A method for the treatment of halitosis using a sweet prepared by the process of claim 4.

10. A sweet of boiled sugar exhibiting a rough texture intended for the treatment of halitosis, comprising a powdered saccharide conferring on it said rough texture, wherein said powdered saccharide exhibits a particle size of greater than 200 microns and a melting point of greater than 110° C.

11. A process for the preparation of a sweet of boiled sugar according to claim 10, comprising the following stages:

cooking a carbohydrate or a mixture of carbohydrates at atmospheric pressure at a temperature sufficient to allow vitrification of the massecuite when it is cooled;

addition to the massecuite of a powered saccharide capable of conferring on the sweet a rough texture intended for the treatment of halitosis, at a temperature below that of the melting point of the powdered saccharide.

* * * * *